US007869027B2

(12) United States Patent
Borucki

(10) Patent No.: US 7,869,027 B2
(45) Date of Patent: Jan. 11, 2011

(54) CONFOCAL MICROSCOPY PAD SAMPLE HOLDER THAT MEASURES DISPLACEMENT AND METHOD OF USING THE SAME

(75) Inventor: Leonard Borucki, Mesa, AZ (US)

(73) Assignee: ARACA, Inc., Tucson, AZ (US)

( * ) Notice: Subject to any disclaimer, the term of this patent is extended or adjusted under 35 U.S.C. 154(b) by 33 days.

(21) Appl. No.: 12/426,574

(22) Filed: Apr. 20, 2009

(65) Prior Publication Data

US 2010/0265576 A1 Oct. 21, 2010

(51) Int. Cl.
*G01N 21/01* (2006.01)
(52) U.S. Cl. .................. 356/244; 359/391; 269/287
(58) Field of Classification Search ............... 359/391, 359/392; 356/244; 269/287; 248/901
See application file for complete search history.

(56) References Cited

U.S. PATENT DOCUMENTS

| 5,438,451 | A * | 8/1995 | Schweizer ............... 359/393 |
| 5,838,448 | A * | 11/1998 | Aiyer et al. .............. 356/632 |
| 6,307,628 | B1 * | 10/2001 | Lu et al. ................. 356/124 |
| 7,120,553 | B2 * | 10/2006 | Benvegnu ................ 702/172 |
| 2010/0128276 | A1 * | 5/2010 | De Groot et al. ........... 356/450 |

OTHER PUBLICATIONS

Elmufdi et al., A Novel Optical Technique to Measure Pad-Wafer Contact Area in Chemical Mechanical Planarization, Material Research Society Symposium Proc. vol. 914 (2006).*

* cited by examiner

Primary Examiner—Mark Consilvio
(74) Attorney, Agent, or Firm—Sughrue Mion, PLLC

(57) ABSTRACT

The present invention is a sample holder for confocal microscopy of CMP pad samples cut or otherwise removed from either new or used CMP pads that maintains a uniform load and pressure over the part of the sample visible to the confocal microscope by placing the pad behind a transparent window and holding it against the said window by a means comprising upper transparent window retaining means having an offset adjacent the transparent window having the same or essentially the same refractive index as the pad material so that when the pad is held against the transparent window, the edges of the pad are outside the outer edge of the transparent window; lower pad retaining means to press the pad under a known/load against the transparent window, which lower pad retaining means has a size less than the size of the pad; spherical force transmitting means pressed against the lower pad retaining means; through a load cell to measure the load transferred to the sample through lower pad retaining means, the spherical force transmitting means, the force transfer means and load cell from the posterior structural housing of the sample holder which is forced together with the said window retaining means by a force generating means; and means to adjust the known load and a method of confocal microscopy of new and used CMP pad samples to determine relative surface area and other characteristics using the said confocal sample.

36 Claims, 1 Drawing Sheet

CONFOCAL MICROSCOPY PAD SAMPLE HOLDER THAT MEASURES DISPLACEMENT AND METHOD OF USING THE SAME

FIELD OF THE INVENTION

The present invention relates to a confocal microscopy pad sample holder that measures displacement of the CMP polishing pad sample surface due to changes in pressure on the said sample surface and methods of using the same.

BACKGROUND OF THE INVENTION

Confocal microscopy is a technique for optical imaging. It uses a spatial pinhole in combination with lenses and a laser to detect that portion of the reflected laser light from the sample that lies within a narrow range of the focal plane of the lenses. The detector can only observe one small portion, or pixel, of the sample at once so images are taken from over the entire sample area to be measured at a rate of several times per second and then reconstructed into a composite image by a computer. By so doing, confocal microscopy enables operators to obtain increased image contrast, provide three dimensional images or both. This principle was expressed in U.S. Pat. No. 3,013,467 hereby totally incorporated by reference and has since been developed in numerous other publications and patents.

Because it enables users to obtain enhanced haze free three dimensional images, confocal microscopy in addition to life sciences, applications has proven particularly useful in the semiconductor industry where it has been applied to inspection of wafers and other semiconductor materials and devices.

Recently the use of confocal microscopy to study the wear characteristics of chemical mechanical polishing (CMP) pads has become important. More particularly the use of laser confocal microscopy and a transparent window to determine contact area and indirectly, the surface characteristics and topography of CMP pads and other materials has become known. Such usage is disclosed in "Application of Laser Scanning Confocal Microscopy to Surface Topography Measurement of CMP Polish Pads," D. J. Stein, D. L. Hetherington, F. B. Kaufman, J. L. Cecchi (Feb. 22-23, 1997) hereby totally incorporated by reference, "Visualization and Measurement of Contact Area by Reflectivity," E. Diaconescu and M. Glovnea, (October 2006) hereby totally incorporated by reference and "Measurement of CMP Pad Contact, Deformation and Flow Resistance: Advances in Microtexture Design and Process Predictability," by G. P. Muldowney, C. L. Elmufdi, B. Jiang, R. Palaparthi (Mar. 6-8, 2007) hereby totally incorporated by reference. The matching refractive indices of the sapphire and pad material mean that pad contact areas will show no reflection whereas pad non contact areas show reflection and interference fringes, allowing a clear contrast and determination of absolute contact area between the pad material and the transparent window to be made.

In 2006 in a paper entitled A Novel Optical Technique to Measure Pad-Wafer Contact Area in Chemical Mechanical Polishing by Carolina L. Elmufdi, Gregory P. Muldowney hereby totally incorporated by reference, it was observed that "Confocal reflectance interference contrast microscopy (C-RICM) uses a single focal plane to image the pad-wafer contact interface. A sapphire cover slip is used to provide optical transparency and to match the refractive index of the pad."

The main problem of the prior art has been, however, that to prepare CMP samples with specific surface areas has required that samples be prepared in specific shapes suitable for observation and measurement. The sample must be carefully cut to the precise shape of the transparent window not leaving any burs or other anomalies on the edge of the sample that might result in uneven support of part of the applied load and bias the contact area measurements over the rest of the sample.

Any variation in the load or more specifically the pressure on any part of the pad in general contact with the transparent window results in anomalous and erroneous results. It is essential to determine the contact area under a uniform load so such edge features must be eliminated by either preparing samples with regular edges (for testing new materials) or careful cutting and preparation of samples to eliminate edge anomalies and burs in the case of testing used pads. This can be very time consuming and reduce both the accuracy of the results and the time efficiency of the operation.

In U.S. patent application Ser. No. 12/108,720, incorporated totally herein by reference, a sample holder for confocal microscopy of CMP pad samples cut or otherwise removed from either new or used CMP pads that maintains a uniform load and pressure over the part of the sample visible to the confocal microscope by placing the pad behind a transparent window and holding it against the said window by a means comprising upper transparent window retaining means having an offset adjacent the transparent window having the same or essentially the same refractive index as the pad material so that when the pad is held against the transparent window, the edges of the pad are outside the outer edge of the transparent window; lower pad retaining means to press the pad under a known/load against the transparent window, which lower pad retaining means has a size less than the size of the pad; spherical force transmitting means pressed against the lower pad retaining means; through a load cell to measure the load transferred to the sample through lower pad retaining means, the spherical force transmitting means, the force transfer means and load cell from the posterior structural housing of the sample holder which is forced together with the said window retaining means by a force generating means; and means to adjust the known load and a method for using the same were disclosed. This device and method overcame the problems of the prior art cited above in regard to the problems created by edge anomalies when observing pad window surface area contact at a given load.

However, the aforementioned invention did not teach any method of determining how much displacement of the pad surface, that is to say compression or decompression of the CMP polishing pad, occurred when different loads were applied and by extension how much the surface area contact changed with specific change in such displacement. Displacement here refers to the displacement of the capacitance probe and the force transmitting means upon which it is riding to and from the window retaining means as the load is increased and decreased and the pad compresses and decompresses respectively and the corresponding "displacement" of the anterior surface of the sample relative to the posterior surface. This factor can provide operators and manufacturers of CMP pads as well as manufacturers of CMP pad conditioners with valuable information concerning the nature of the CMP pad surface and the effect of CMP processes on it. In particular such information would provide better knowledge of the roughness of the pad and depth, elevation and width of surface features on the pad.

SUMMARY OF INVENTION

The present invention relates to a sample holder for confocal microscopy based upon the sample holder of CMP pad samples disclosed in U.S. patent application Ser. No. 12/108, 720. That is to say it is a sample holder of CMP pad samples cut or otherwise removed from either new or used CMP pads that maintains a uniform load and pressure over the part of the sample visible to the confocal microscope by placing the pad behind a transparent window and holding it against the said window by a means comprising upper transparent window retaining means having an offset adjacent the transparent window having the same or essentially the same refractive index as the pad material so that when the pad is held against the transparent window, the edges of the pad are outside the outer edge of the transparent window; lower pad retaining means to press the pad under a known/load against the transparent window, which lower pad retaining means has a size less than the size of the pad; spherical force transmitting means pressed against the lower pad retaining means; through a load cell to measure the load transferred to the sample through lower pad retaining means, the spherical force transmitting means, the force transfer means and load cell from the posterior structural housing of the sample holder which is forced together with the said window retaining means by a force generating means; and means to adjust the known load and a method for using the same wherein the displacement of the pad surface from the sapphire window is measured by means of a capacitance probe fixed to the force transfer means that is calibrated at a determined distance from the window retaining means, which is made of a conductive material, and taking the reading from the said capacitor probe to determine the relative position of the probe as it moves together with the surface of the pad sample closer to or further from the sapphire window at increased and decreased loads respectively.

DETAILED DESCRIPTION OF THE PRESENT INVENTION

Figure 1:
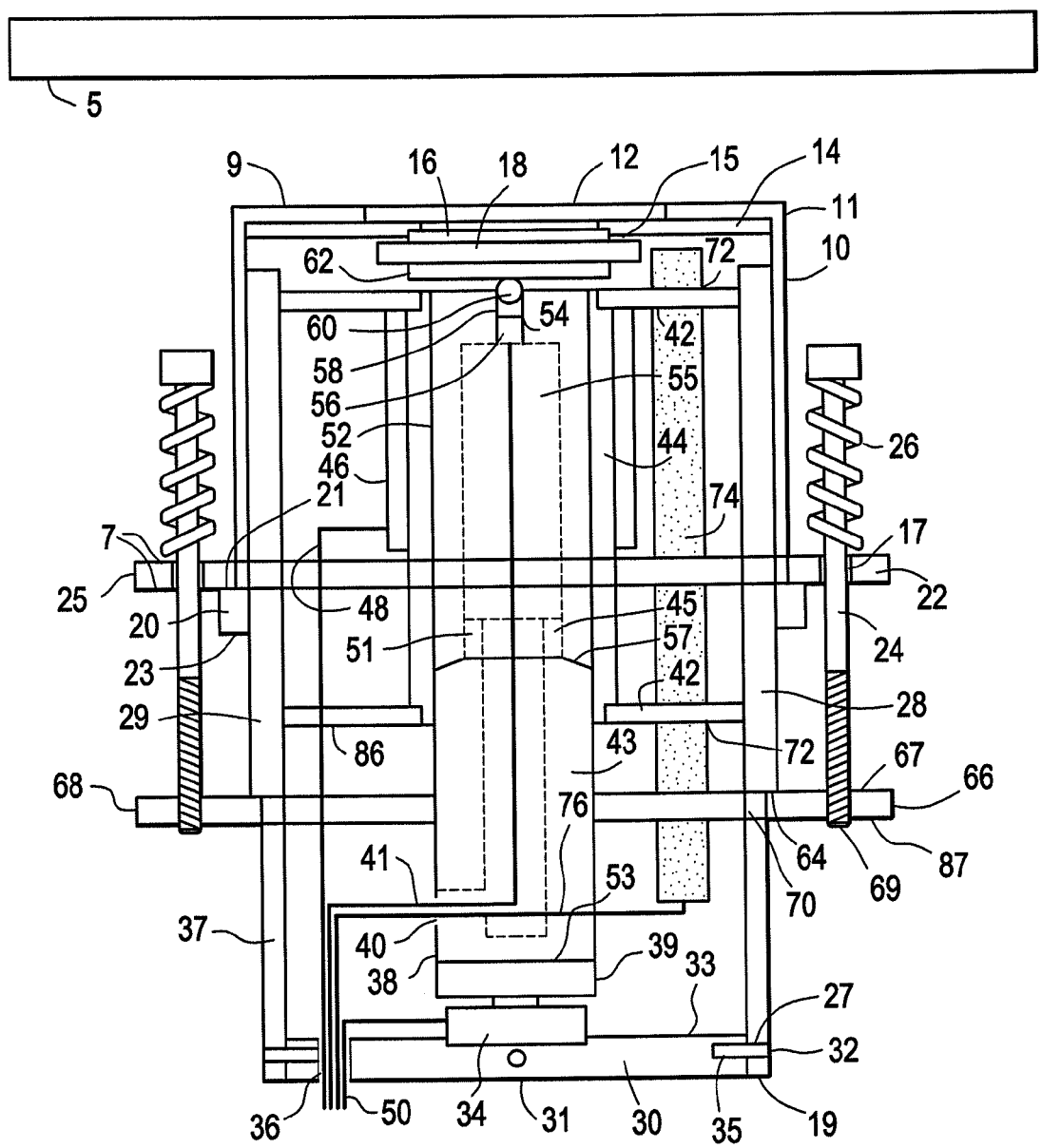
FIG. 1 is a cross sectional side view of a sample holder in accordance with the present invention.

In the present disclosure, "anterior" or "anterior direction" shall refer to the direction toward the confocal microscope when the CMP sample pad holder is in use and "posterior" or "posterior direction" shall refer to the direction away from the confocal microscope during use.

The inventor(s) of the present invention, in order to solve the problem of easily observing the surface displacement under different loads for observation under a confocal microscope of a polyurethane chemical mechanical polishing pad have as a result of systematic and prolonged study of the problem arrived at a solution to the problem of reliably providing a sample of a shape and under conditions suitable for observation by confocal microscopy.

More particularly they have devised a sample holder for confocal microscopy of a sample of a chemical mechanical polishing (CMP) pad at a known load wherein the pad sample is held against a transparent window of a hard material, said window held against the sample in anterior to and by means of a window mounting ring, the said window mounting ring affixed in turn to the inside bottom surface of the anterior structural housing of the sample holder, referred to as the cap, placed over the posterior housing of the sample holder, referred to as the cup, secured to a ring mounted on a step in the cup wall, the aperture of which transparent window or at least the portion within the view of the confocal microscope must be transparent and not covered by an opaque material and the remaining part of which may be covered by an opaque material—if nothing else this permits the operator of the microscope to see where to aim—, the transparent portion of which window comprises a regular curved or polygonal geometric shape, most typically a circle, square, pentagon, hexagon or any shape leaving a sufficient aperture for confocal microscopy or the like, and the portion viewed by the confocal microscope must in all parts overlay the sample which within these bounds does not have an edge or any tear hole or other anomalous feature associated with the edge of a sample and under all of which additionally the lower pad retaining means must be present opposite the transparent window, the lower pad retaining means in turn being held against the sample by a force transfer unit comprising a spherical force transmitting means supported in an opening on the anterior face of the force transmitting means which in turn comprises a force transfer unit with a plug supported in said opening in the anterior portion of the said force transfer unit, which force transfer unit is held in proper place and alignment within the cup by spacing rings and connected opposite the said spherical force transmitting means and plug to the load cell and thereby to the cup wherein the end of a capacitance probe is fixed within the spacing rings of the spindle guiding the force transmitting means, the end of which capacitance probe is set, and if necessary, calibrated, at a measured distance within the range indicated by the specifications of the capacitance probe from the window retaining means, which window retaining means is made of a conductive material, and taking the reading from the said capacitor probe to determine the relative position of the probe as it moves with the surface of the pad sample closer to or further from the sapphire window under increased and decreased loads respectively.

In addition, they devised a method for simultaneously observing a sample of a chemical mechanical polishing pad at a known load by confocal microscopy and determining the displacement of the CMP pad surface from the transparent window of hard material as the load is changed wherein the pad sample is held against a transparent window of a hard material, itself held against the sample by means of a anterior window mounting ring, the window mounting ring, made of metal or another electrically conductive material, being affixed in turn to the inside bottom surface of the cap, the aperture or portion viewable by confocal microscope of such transparent window must be transparent and not covered by an opaque material and the remaining part of which may be covered by an opaque material, the transparent portion of which window comprises a regular curved or polygonal geometric shape, preferably a circle, though a square, pentagon, hexagon or any shape leaving a sufficient aperture for confocal microscopy or the like may be used, and the portion of the transparent window viewed by the confocal microscope must in all parts overlay that part of the sample does not possess any edge or any tear, hole or other anomalous feature associated with the edge of a sample and under all of which additionally the lower pad retaining means must be present directly opposite the sample from the transparent window, the lower pad retaining means in turn being held against the sample by a force transfer unit comprising a spherical force transmitting means supported in an opening on the anterior face of the force transmitting means which in turn comprises a force transfer unit with a plug supported in said opening in the anterior portion of the said force transfer unit, which force transfer unit is held in proper place and alignment within the cup by spacing rings and connected opposite the said spherical force transmitting means and plug to the load cell and thereby to the cup. The capacitance probe may be a long cylindrical sensor that is inserted in holes prepared in the spacing rings so that it is aligned perpendicular to the surface of the window mounting ring and so that the anterior end, the sensor end, of the capacitance probe is at least about $\frac{1}{4}^{th}$ inch or less and preferably about $\frac{1}{25}^{th}$ or less of an inch from the posterior surface of the window mounting ring. The capacitance probe is attached to a signal cable that carries the data signal to a processor and readout device.

The apparatus of the present invention has been developed in response to the present state of the art, and in particular, in response to the problems and needs in the art that have not yet been fully solved by currently available CMP pad sample holders for confocal microscopy. Thus, it is an overall objective of the present invention to provide CMP pad sample holders for confocal microscopy and related methods that remedy the shortcomings of the prior art.

The purpose of this device and method are to allow more effective confocal microscopy of a section of CMP pad together with simultaneous determination of the displacement of the pad surface as the pad expands and compresses under lighter and heavier loads. A CMP should be rough so that together with CMP slurry it is able to wear away and planarize the metal surface of wafers for such semiconductor wafers as silicon wafers or silicon compound wafers that have been plated with copper or tungsten or other materials and thereafter to planarize the semiconductor surface itself. They are manufactured rough and although the CMP process wears the surface of the polishing pad down making it more smooth, diamond conditioner pads used in CMP continuously make the surface of the pad rougher at the same time.

Manufacturers and users of CMP pads need to know how rough a new pad is to begin with, for new pads, and, for used pads, they need to know to what extent a pad is still rough after use for various periods of time at the loads applied during CMP. This information allows manufacturers to improve the properties of pads and discover defects such as undesired non-uniformity of roughness at different places in the pad surface or lack of adequate roughness following limited use or the like and allows users to optimize their use of a given pad type. These factors vary among different types of pads and with different CMP processes.

It has been known on the art for some time that confocal microscopes can clearly show surface contact area of a CMP pad by means of a transparent window. Since a sapphire has the a refractive index over the visible spectrum as the polyurethane material used in CMP polishing pads ranging between about 1.797 at a wavelength of 351 nm to 1.766 at a wavelength of 632.8 nm (information published by Mellesgriot at www.mellesgriot.com/product/optics/mp_3_5.htm), a dark area is visible on the transparent window where roughness peaks on the pad surface are pushed against and contact the transparent window. It is possible to observe this using confocal microscopy and this provide a means of determining the percent of surface area of the pad in contact with the transparent window and hence the relative roughness at a given load (Ibid Elmufdi & Muldowney 2006). The confocal microscopy image of a polishing pad pushed against a transparent window is divided into clearly delineated light (non-contact) and dark (contact) zones. The respective surface areas of these light and dark zones can be measured using suitable software well known to those skilled in the art or visually by means of a grid system placed on a photograph of the are viewed by the confocal microscope, the squares of which are designated as dark or light and counted to determine the relative area of the pad in contact with the transparent window. The degree to which the pad deforms under a given load is also a characteristic of the polishing pad and the material from which it is made. The pad, since it is plastic, deforms under pressure, and increased pressure increases the percent of the pad in contact with the window. This effect corresponds to actual use where, instead of being in contact with the transparent window, the pad is in contact with the wafer.

In the prior art, when confocal microscopy was used, small pad samples roughly one half inch in size were cut from pads in use and placed on a ½ inch transparent window. It was not easy to then determine what uniform pressure was on the pad and irregularities around edge of the pad sample caused serious measurement errors. These irregularities included irregular cuts, holes and cracks in the pad which left areas of open space insuring that the load on the sample facing the transparent window was not uniform as the pad could deform into these open areas to relieve pressure and additionally because such open space features erroneously increase the apparent area of non-contact. Additionally burs on the edge of the sample resulting from cutting the sample out of the pad, if placed under the transparent window would serve to force the window away from the surface creating large and erroneous non-contact zones when the sample was viewed by confocal microscopy.

The invention disclosed in U.S. patent application Ser. No. 12/108,720 overcame the problems of the prior art by making samples size larger, preferably at least one sixteenth of an inch beyond all the edges of the part of the transparent window that is not covered by the window mounting ring 14, and surrounding opaque materials that make up the cap, that is to say, the aperture of the transparent window, and preferably larger than the entire transparent window, there being no applicable maximum size of the dimensions of the sample in excess of those of the aperture or transparent window as long as the sample does not contact the walls of the cup, and applying force through the lower pad retaining means posterior to the sample which is the same shape as the aperture or very similar in shape thereto (hence everything viewed by the confocal microscope is under the same pressure and there are no anomalies), thus forcing the sample against the transparent window which is set against a window mounting ring set or fixed within the anterior part of the cap. The window mounting ring defines the aperture in that the inside open portion of the ring allows light to be transmitted to and from the transparent window and the metallic portion of the ring prevents light from being transmitted to and from the transparent window. The dimensions of the open portion of the ring define the aperture. It is not essential that the aperture be the same shape or size as the field of view of the confocal microscope, and ideally it may be slightly larger. What is important is that the entirety of the sample surface within the field of view of the microscope be pressed from the posterior side of the sample by the lower pad retaining means. For that reason it is not essential that the edge of the sample extend beyond the edge of the transparent window or that parts of the transparent window extend beyond the edge of the sample as long as all of the sample in the field of view is anterior to some portion of the lower pad retaining means and as long as there is no gap, tear, bur, or jagged edge of the sample that falls within the area anterior to said lower pad retaining means. However, since the lateral dimensions of the aperture are generally very nearly the same as the lateral dimensions of the transparent window, typically the difference is within $\frac{1}{16}^{th}$ inch, because the portion of the transparent window covered by the window mounting ring is small, as a practical matter, it is preferable that the edges of the sample extend beyond those of the transparent window so that when the sample is set against the transparent window, it is easily determined that there are no anomalous edge features such as cracks, gaps, tears, holes or burs within the field of view. As long as the entire sample extends beyond all of the edges of the transparent window, it is not essential that the sample and the transparent window have the same shape; however it is preferred that they have the same shape and this shape is, to the extent permitted by practical sample cutting methods, circular. It is also preferred that the lower pad retaining means, though its lateral dimensions need only be equal to or larger than the field of view of the confocal microscope, be the same or essentially the same as those of the transparent window. Because the lower pad retaining means is made of a hard stiff material, it is not essential that the pad retraining means have exactly the same shape as the transparent window. However, if the shape varies by much from that of the transparent window, there is a danger that the pressure of the pad on the surface of the window may vary slightly toward the edge of the pad restraining means in areas behind where the shape of the pad retaining means differs unless of course the pad retaining means is larger than the window. It is preferred that the lower pad retaining means possess the same lateral shape as the sample and the transparent window, and it is further preferred that this shape be a circle. Force is applied to the lower pad retaining means by a spherical force transmitting means force transferring means that sits on a load cell. The load cell sits on the anterior surface of the floor of the cup. The cup and cap are bolted together by spring bolts through rings held by a lip on the posterior rim of the cap and a step in the walls of the cup. As the bolts are tightened, the springs press against lip of the cap through the said ring forcing the cap further down on the cup. Since the transfer of force between the cup and the sample is through the load cell, force transferring means, spherical force transmitting means and lower pad retaining means, the load cell registers how much "load" is on the sample. The spherical force transmitting means ensures that the sample and lower pad retaining means sit optimally on the transparent window and window mounting ring. As a result, the load is uniform throughout the sample insofar as the lower pad retaining means is under all parts of the sample that are being viewed.

Since the capacitance probe is fixed to the sliding guides of the force transmitting means as the CMP pad compresses under increased load, the force transmitting means moves slightly closer to the window maintaining ring, and the capacitance probe moves with it precisely the same distance. This registers in the capacitance probe output of capacitance data as a change in capacitance or in models available commercially for that purpose as distance. For un-calibrated capacitance probes, if the relationship between this change and the change in distance is known for the capacitance probe used or can be calibrated, it is possible to use this data to determine the movement of the surface of the CMP pad due to compression, primarily of elevated structures on the roughened surface of the pad and correspondingly decompression as the pressure is released. Contact with the transparent material means provides a measure under confocal microscopy of how much of the surface is in contact with the transparent window. Obviously, if the surface features of the pad are pronounced with a relatively large separation between them compression between two loads will occur to a greater extent than if the surface features are short and separated by smaller distances. In this way a combination of confocal microscopy and analysis of capacitance data can provide a substantially more complete picture of what the surface of the CMP polishing pad is like.

The present invention may also be used where the basic confocal microscopy sample holder is of the embodiment of U.S. patent application Ser. No. 12/108,720 characterized by rearranging the screws and adding an additional sliding bearing tube with a threaded screw (not shown) it is possible to leave the first two bolts set and adjust load using only the one screw. To achieve the foregoing objective, and in accordance with the invention as embodied and broadly described herein in two embodiments a CMP pad sample holder for confocal microscopy is provided.

Through the use of the CMP pad sample holders for confocal microscopy and related methods presented herein, a microscopic observation may be rapidly carried out with a minimum of errors in the relative surface contact area observed due to irregular or burred edges of the sample. Furthermore, this enhanced microscopy may be easily and cost-effectively applied to facilitate and enhance the use of CMP polishing devices and the polishing pads used in them. These and other features and advantages of the present invention will become more fully apparent from the following description and appended claims, or may be learned by the practice of the invention as set forth hereinafter.

All dimensions for parts in the present invention follow are based on a an approximate CMP pad sample size of about ½" to ⅝ inch in diameter and may be altered as needed in proportion to changes in the size of the sample used. The specific dimensions given herein are in no way limiting but are by way of example to demonstrate an effective embodiment of the invention.

As shown in FIG. 1 and following U.S. patent Ser. No. 12/108,720, a cylindrical casing or cylindrical housing of a hard material called the cup 28 that is open on one end and closed on the other. The cup may be made of any material that is easily fashioned in the dimensions required by the present invention and hard plastics are preferred and polycarbonate is more preferred. A circular detachable bottom 30 made of polycarbonate or other suitable hard material and having a preferred thickness of about 0.175" and with a diameter such that it fits precisely within the cylindrical walls 29 of the cup 28 is placed so that the posterior face 31 of the detachable bottom 30 is even with the posterior end 19 of the cylindrical walls 29 of the cup 28.

This detachable bottom 30 possesses a depression in the center of the anterior face 33 thereof in which a load cell may be seated and affixed, a load cell 34 and cable port opening 36. Detachable bottom 30 is affixed to the cylindrical walls 29 of the cup 28 to close the end of the cup 28 by any suitable means so that it will be immobile with respect to the walls even during application of load. One preferable means comprises a number of pins 32 holding the detachable bottom of the cup in place inserted through drilled holes 27 in the walls of the cup 28 into drilled holes 35 in the sides of the detachable bottom 30. Preferably where pins 32 are used there should be at least 4 pins and at least 4 corresponding drilled holes 27.

Against the anterior face 33 of the detachable bottom 30 of the cup 28 a load cell 34 is affixed to a recess (not shown) prepared for the affixation of the load cell and the load cell 34 in turn is connected to cable 50 that passes though the an opening 36 in the detachable bottom 30.

About halfway along the outside of the cylindrical walls 29 of the cup 28 is a slight step 64 perpendicular to the direction of the cylindrical walls 29 such that the cylindrical walls 29 are thinner 37 toward the posterior end 19 of the cylindrical walls 29 of the cup 28. The step 64 is about 0.01" deep and may be shallower or deeper depending on changes in the size of the device or other pertinent conditions. The purpose of this step 64 is to hold a ring 66, the inner edge 70 of which possesses the same diameter of the outer surface of the thinner part 37 of the cylindrical walls 29 of the cup 28. The outer edge 68 of the ring 66 has a diameter of 1.2" for a sample size of about ½" to ⅝" diameter and this may also be varied according to the size of the sample and circumstances. The ring 66 is flattened with faces 67 perpendicular to the cylindrical walls 29 of the cup 28 and is 0.075" thick although the thickness may be altered as needed. There are 2 threaded holes 69 equidistantly spaced around the ring 66 centered halfway between the inner edge 70 and outer edge 68 of the ring 66.

Inside of the cup 28, set anterior to the load cell 34 is the force transfer means. The force transfer means may be any suitable means of transferring force from the load cell to the spherical force transmitting means, but a cylindrical columnar structure is made of material that will not deform or alter shape appreciably at loads contemplated in the present invention (typically 20 pounds or less) is preferred and a hollow cylindrical columnar structure is more preferred. This cylindrical columnar structure can consist of cylindrical components fashioned to fit tightly together where, as in the first preferred embodiment, it may desirable to take advantage of different material properties such as the easy workability of a plastic material such as nylon as used in hollow cylinder 43 of the nylon cylinder portion 38 of the force transfer unit comprising, in order, from the load cell 34, a pad 39 of steel or similar material of about 0.02" thickness and about 0.5" diameter upon which is affixed the said hollow cylinder 43 made of nylon or other suitable materials closed on either end about 0.5" in diameter and 1.0" long. The anterior face of pad 39 comprising the posterior end of the hollow cylinder 43 of the nylon cylinder portion 38 of the force transfer unit rests flat against the hollow cylinder 43 and the posterior face of pad 39 rests on load cell 34.

The anterior end of the hollow cylinder 43 of the nylon cylinder portion 38 of the force transfer unit, which corresponds in this case to the entire force transmitting means, is walled but with a centered cylindrical protrusion 45 of 0.1" height and 0.32" diameter protruding from the anterior wall thereof. A thermocouple cable entry opening 40 is made in the lower side of the hollow cylinder 43 of the nylon cylinder portion 38 of the force transfer unit and a thermocouple cable 41 passes into the hollow cylinder 43 of the nylon cylinder portion 38 of the force transfer unit. The openings are easy to prepare in this embodiment since the material is nylon. The anterior wall of the hollow cylinder 43 of the nylon cylinder portion 38 of the force transfer unit has an opening 51 so that the thermocouple cable 41 may pass into the anterior portion 52 of the force transfer unit to the opening at the anterior end 54 of the force transfer unit past the plug 56 to connect with the thermocouple 58.

The anterior portion of the force transmitting means and therefore, in this embodiment, the force transfer unit 52 is metallic and made preferably of copper, aluminum or steel, possesses the same external diameter as the hollow cylinder 43 of the nylon cylinder portion 38 of the force transfer unit, is open at the posterior end 53, and possesses an internal diameter the same as the diameter of the cylindrical protrusion 45 on the anterior wall of the nylon cylinder portion 38 of the force transfer unit so that the said cylindrical protrusion 45 fits tightly inside the posterior end 53 of the anterior portion 52 of the force transfer unit as if it were a sleeve. It is made of these metals or some other thermally conductive material for the reason that in this embodiment a heater is included. In the event that a heater were not included any material hard enough not to be deformed under the loads contemplated under the present invention would be acceptable and, for example, nylon might be used. The tight fit between the anterior and posterior portions of the force transfer unit is made to ensure the integrity of the load bearing structure. There is an opening 54 in the cylindrical protrusion 45 of the hollow cylinder 43 of the nylon cylinder portion 38 of the force transfer unit through which the thermocouple cable 41 passes into the hollow interior 55 of the anterior portion 52 of the force transfer unit and from which the said thermocouple cable 41 continues to run in an anterior direction along the length of said hollow interior 55.

The anterior end of the hollow cylinder 43 of the nylon cylinder portion 38 of the force transfer unit possesses a centered cylindrical protrusion 45 protruding from the anterior wall thereof. There is a thermocouple cable entry opening 40 is in the lower side of the hollow cylinder 43 of the nylon cylinder portion 38 of the force transfer unit and a thermocouple cable 41 passes into the hollow cylinder 43 of the nylon cylinder portion 38 of the force transfer unit. The anterior wall of the hollow cylinder 43 of the nylon cylinder portion 38 of the force transfer unit is seen with opening 51 so that the thermocouple cable 41 passes into the anterior portion 52 of the force transfer unit to the opening at the anterior end 54 of the force transfer unit past the plug 56 to connect with the thermocouple 58.

The anterior portion of the force transmission unit 52 has the same external diameter as the hollow cylinder 43 of the nylon cylinder portion 38 of the force transfer unit, is open at the posterior end 53, and possesses an internal diameter the same as the diameter of the cylindrical protrusion 45 on the anterior wall hollow cylinder 43 of the nylon cylinder portion 38 of the force transfer unit so that said cylindrical protrusion 45 fits tightly inside the posterior end 53 of the anterior portion 52 of the force transfer unit as if it were a sleeve. There is an opening 54 in the cylindrical protrusion 45 of the hollow cylinder 43 of the nylon cylinder portion 38 of the force transfer unit through which the thermocouple cable 41 passes into the hollow interior 55 of the anterior portion 52 of the force transfer unit and from which the said thermocouple cable 41 continues to run in an anterior direction along the length of the hollow interior 55 and enters the force transfer unit through opening 40.

In the anterior wall 57 of the anterior portion 52 of the force transfer unit is an opening 0.125" in diameter 54 in which there is first a plug 56 composed of copper, aluminum, or steel or other durable but thermally conductive substance through which the thermocouple cable 41 passes and set against the said plug 56 is the thermocouple 58 but cable 41 does not pass entirely through the anterior wall 57 and thermocouple 58 is located within the wall behind ball bearing 60. The cable does not pass through the wall entirely because it is desirable to locate the thermocouple within the wall behind the ball bearing 60. The ball bearing 60 transfers heat from the heater 46 into the sheet of hard material 62 and thence into the sample 18. Anterior to the thermocouple 58 and of a very slightly larger thickness or diameter than the opening 54 but still lodged within the opening 54 is the spherical force transmitting means, which may be any spherical structure securely attached to or lodged in force transmitting means but is preferably a metallic thermally conductive spherical ball bearing the such as the thermally conductive ball bearing 60 of the preferred embodiment or other similar body. The ball bearing 60 can be made of steel or other similar suitably durable and thermally conductive materials. The spherical force transmitting means must in any event be sufficiently durable that all of the load contemplated to be transmitted to the lower pad retaining means can be transmitted thereto through the tangent point of the anterior part of the said spherical transmitting means without deforming it. The ball bearing 60 is suitable for this purpose. The diameter or thickness of the spherical force transmitting means may be any suitable dimensions provided however that the use of a ball bearing 60 slightly larger than the diameter of the opening 54 so that the ball bearing 60 may just sit or lodge in the opening 54 but may not be forced into it entirely when subjected to pressure is preferred. A spherical shape for the ball bearing is preferred but any curved or pyramidal body or the like with a single centralized point foremost in the anterior direction may be used.

The most anterior point on the surface of ball bearing 60 just touches and supports a the lower pad retaining means. The lower pad retaining means may be any means of sufficient structural integrity and durability to bear the loads contemplated in the present invention and which has a flat anterior surface of adequate dimension to support the pad and a circular hard material plate, that is to say a sheet of hard material 62 that holds the sample 18 firmly against the transparent window 16 is preferred. The sheet of hard material 62 is 0.500" in diameter and 0.03" thick though these dimensions may be varied according to the size of the sample and apparatus as a whole and it is preferably made of steel or a steel alloy and has the same shape as the transparent window. The sheet of hard material 62 need not be the same size or shape as the transparent window 16 and is not particularly limited, but it should preferably be close to the same size and shape and more preferably the corresponding later dimensions such as the diameter where applicable are preferably within the range of 20 percent smaller than those of the transparent window 16 to 20 percent larger than those of the transparent window 16. Upon the sheet of hard material 62 rests the sample 18 of a CMP pad cut or prepared so that its minimum lateral dimension or diameter is slightly greater than the corresponding dimensions of the sheet of hard material 62.

Above the sheet of hard material 62 is a transparent window 16 made of sapphire by Meller Optics, 0.500" diameter, and 0.5-2 mm thick which has essentially the same diameter or corresponding lateral dimensions as the sheet of hard material 62 and is aligned with it along an anterior posterior axis. The similar dimensions make it more likely that it will be evenly distributed throughout the sample 18. The transparent window 16 is held against the sample 18 and sheet of hard material 62 by a window retaining means which may be any means that will hold the window firmly in place under pressures resulting at the pad surface under loads contemplated in the present invention and a window mounting ring 14 the inside of which rests on the anterior face of the transparent window 16, which is 0.460" diameter and therefore smaller than the diameter of transparent window 16, and which may be made from metal such as aluminum or steel or from hard plastic or the like is preferred. The inside diameter of the window mounting ring 14 must be smaller than the diameter of the transparent window 16 to hold it securely when pressure is applied. The difference must be sufficient to ensure that the window mounting ring 14 holds the transparent window 16 securely. Any size and shape of aperture sufficient to permit undisturbed confocal microscopic viewing of the transparent window may be used but a circular shape is preferred. The window mounting ring 14 may be made of any suitable structurally had and electrically conductive material an metal is preferred. It is incorporated or set into the inner face of the partially open roof or roof ledge 9 of cap 10 that is made of any suitable structural material, preferably polyvinyl chloride, and fits as a sleeve over the cup 28 to a point about 0.25" short of the ring 66 at step 64.

Cap 10 is shown with 11 indicating the anterior portion of the cap 10 with opening 12 in roof 9 of the cap 10, showing the walls 13 of the cap, the perpendicular lip 20 of the cap, the anterior flat surface 21 of the lip 20 and the posterior flat surface 23 of the lip 20.

Lip 20 supports a ring 22 of interior diameter equal to the outer diameter of the cap 10 anterior to the lip 20 so that it may slide smoothly onto the cap as far as the lip. The anterior surface and posterior surface of the ring are flattened 7 having 0.075" thickness between them and ring 22 possesses a 1.2" outer diameter with the flat surfaces 7 coplanar with the flat surfaces 67 of said ring 66 slid onto the cylindrical walls 29 of the cup 28. The lip 20 may be an integral part of cap 10 or may be attached, but it is preferred that it be an integral part of cap 10. Since the cap and cup must be forced together to generate the load transmitted to the transparent window 16 and sample 18, the force generating means are any means that can be easily and consistently controlled and adjusted that force the cup 28 and cap 10 together. Any force generating means may be used but bolts pressed by springs attached to the cap and cup are preferred. The force transmitting means of the preferred embodiment of the present invention comprises the cap 10 the cup 28 and two rings 22 and 66 and bolts 24 and springs 26 to force the cup 28 and cap 10 together. The same number of holes 17, unthreaded and slightly larger in diameter so that the threaded portion of the bolts 24 may pass through unhindered are placed in positions in ring 22, ring 22 is slid anterior to lip 20 so that these holes 17 align with threaded holes 69 in ring 66 on cup 28. Through holes 17 in the ring 22 and into the threaded holes 69 in ring 66 are inserted bolts 24 of suitable size and thread with springs 26 resting between the bolt heads and the lip 20. The springs 26 can press the lip ring 22 and via ring 22 the lip 20 and thereby the cap 10 down onto the transparent window 16 and against the sample 18, whereby the resulting force is passed to force transfer unit (the combination of 52 and 53) and finally passed to the load cell 34. The bolts 24 can be tightened or loosened to position cap 10 on cup 28 so as to increase or decrease the load created by the compression of springs 26.

Because sample 18 and transparent window 16 rest on a sheet of hard material 62 on ball bearing 60 on one side and are held by the window mounting ring 14 on the other side, if anterior portion 11 (not shown) of cap 10 (not shown) and the window mounting ring 14 are perpendicular to the walls of the cap 13 (not shown) and cup 28 has slid snuggly into the cap, the sheet of hard material 62 will rotate on the ball bearing 60 until the transparent window 16 sits completely flat on the window mounting ring 14 and this, if the window mounting ring 14 and since the roof of the cap 9 is at right angles with the walls of the cap 13 and cup 28, the surface of the transparent window 16 will be perfectly perpendicular to the walls 29 of the cup 28 and the direction of load applied and to the direction in which light is to be transmitted to the confocal microscope 5, a necessity for observing the sample.

Also shown are opening 12 in the anterior portion of the cap, offset 15 between the window mounting ring 14 and sample 18, cable 48 for the heater 46, anterior portion 52 of the force transfer unit, opening 54 at the anterior end of the force transfer unit, plug 56 at the anterior end of the force transfer unit and thermocouple 58 at the anterior end of the force transfer unit.

Finally, within cup 28 there is a spindle, the discs or spacer rings 42 of which are made of polycarbonate or material possessing similar physical characteristics and the tube 44 of which is made of or clad in copper or other thermally conductive metal or alloy. The tube 44 of the spindle is hollow and open ended and of an interior diameter just sufficiently large to hold and permit smooth movement of the anterior portion 52 of the force transfer unit and hollow cylinder 43 of the nylon cylinder portion 38 of the force transfer unit as a sleeve so that the force transfer unit can move slightly in the anterior and posterior direction. In effect only slight movability is required to allow the load to be transferred from cup bottom 30 the load cell 34 the force transfer unit, the ball bearing 60 and the hard sheet of material 62 to the sample 16. Because of the nature of the device, significant motion of the force transfer unit would be impossible but if it is immobile the load could neither be transferred nor measured. The spacer rings 42 are made of polycarbonate sheets with a thickness of about 0.093" and are designed to serve as centering rings to hold the tube 44 and as may be seen, the force transfer unit inside is in perfect alignment with the anterior posterior axis and in the center of the cup 28. Around the copper cladding 85 of tube 44 of the spindle may be placed a heater 46 such as a polyimide heater with the power supply cable 48 entering the opening 36 where the thermocouple cable 41 entered the cup 28 and then proceeding through opening 86 in the lower spacer ring 42 of the spindle.

In the confocal microscopy sample holder of U.S. patent application Ser. No. 12/108,720 thus described, through the aforesaid spacing rings 42, aligned openings 72 aligned in the direction of motion of the force transfer unit are prepared. The size of the openings is not particularly limited abut openings between 0.0001 and 0.1 inches in diameter are preferred. The size of the openings should be roughly equal to or slightly larger than the diameter of the capacitance probe used. The number of sets of openings, one opening per set for each spacing ring, is not limited but between one and four sets of openings, is preferred and one set, that is to say one opening on the anterior spacer ring and one opening, aligned as aforesaid, on the posterior spacing ring is more preferred. Where more than one capacitor probe is used it is preferred that the openings be evenly spaced around the central anterior posterior axis of the confocal sample holder. The openings can be placed at any radial distance from the center of the confocal sample holder great enough to avoid contact with the central force transfer unit or the central part of the spindle. A cylindrical capacitance probe 74 the diameter of which is the same size or very slightly smaller than the said openings is inserted, one per each set of openings. The type of capacitance probe is not particularly limited and any capacitance probe having suitable dimensions may be used, but a cylindrical capacitance probe between 0.1 and 1 inches in length and between 0.05 and 0.2 inches in diameter is preferred. The end of the capacitance probe should be placed a short distance away inches away from the window mounting ring 14 and the capacitance probe fixed to the spacing rings. The distance from the window mounting ring 14 is not particularly limited but between 0 and 200 microns is preferred and between 0 and 100 microns is more preferred. The distance between the end of the probe should be measured as precisely as possible to insure consistency in results between different devices. The method for fixing the probe to the spacing rings is not particularly limited and any suitable method may be used, but the use of adhesives is preferred. As the adhesive of the present invention any suitable adhesive may be used and epoxy resins or quick dry commercially available super glues are preferred.

From the capacitance probe extends a data signal cable 76 and this should be drawn through opening 36. The data signal cable is attached to a data processor equipped for that purpose and an output device. The type of capacitor probe that may be used is not limited and any kind of probe that will fit within the confines of the confocal microscope stage, function accurately and not otherwise disturb the working of the stage may be used but a cylindrical probe between 1 and 5 mm diameter and between whatever distance is from the window mounting ring 14 to the posterior spacing ring to about 20 mm is preferred and a cylindrical capacitance probe of about 3 mm diameter by 15 mm length is most preferred. The range of the probe should be at least to between 100 and 200 microns with a precision of between about 0.1 microns. Any commercially available capacitance probe for measuring displacement meeting the aforementioned specifications may be used, however, a commercially available probe meeting the above specifications that is pre-calibrated for distance at the factory and has attached cable 76 and readout devices (not shown) is preferred. The distance from which the capacitance probe is set from the window mounting ring for a no load condition is not particularly limited, provided, however, that the distance from the window mounting ring during use must be within the specifications range of the capacitance probe and a distance of ¼ inch or less when a blank pad is occupying the space between the transparent window and the lower pad is preferred and a distance of $\frac{1}{25}^{th}$ of an inch or less is more preferred. Note that these distances are calculated on the basis of a sample of the standard thickness of a CMP pad being present. A perfectly smooth (polished) sample or a circular metal cutout polished to precisely the "standard" thickness of a pad sample may be inserted in the confocal sample holder to set this distance.

The invention provides a sample 18 of a CMP pad behind a transparent window 16 which, having nearly the same refractive index as the pad, will allow confocal microscopy showing the contrast between areas of the transparent window 16 where the transparent window 16 is in physical contact with the sample 18 and areas where it is not. This difference is caused by the topography of the pad and both the structural details of the contact and the total contact area are desirable data to obtain. The present invention allows a set area and geometry of the pad to be viewed and all of it under identical and uniform load conditions. The operator may wish to recreate the load conditions on the pad during operation or try to determine variation in contact area at different loads. By varying the load and observing and correlating both surface area contact and displacement of the pad surface at varying loads it is possible to obtain considerable useful information concerning both the surface conditions and the physical characteristics of the CMP pad and processes for its used as well as conditioning processes and devices. Generally speaking, greater displacement with less variation in surface area between displacement points may point to greater surface roughness. The patterns of contact at different displacement and the way they change may also be of interest. Finally the relationship between change in displacement and change in load is of considerable interest to CMP operators and manufacturers of CMP polishing pads, equipment and conditioning discs.

Load is adjusted by tightening or loosening bolts 24 pressed by springs 26 and holding the cap 10 on the cup 28. As these bolts 24 are tightened, cup 28 slides further down the cup and window mounting ring 14 presses the transparent window 16 with greater force due to the load imparted by springs 26 through the apparatus against the sample 18, while ball bearing 60 holds and thereby maintains a substantially constant load on the sheet of hard material 62, and maintains sample 18 and transparent window 16 in the correct orientation with respect to confocal microscope 5. As this occurs, the distance between capacitance probe 74 and the window mounting ring 14 changes as well. The actual load on sample 18 is transferred from sample 18 through the sheet of hard material 62, ball bearing 60 and plug 56 through the force transfer unit or as a combination of 52 and 53 and registered by the load cell 34. The direct application of force on the load cell 34 is further guaranteed by the guidance provided by the spacer rings 42 and tube 44 of the spindle.

The only portions of sample 18 visible are under a constant and uniform pressure which can be calculated by the total load registered by load cell 34 divided by the total area of transparent window 16. Thus by knowing the pressure per square inch on the transparent window 16 from the area and the load determined by the load cell it is possible to determine what the load on the original pad would have been as well. Any pressure and therefore any load normally used in CMP polishing may be applied to the sample 18 of the present invention but pressure of between 0 and 11 pounds per square inch are preferred and pressures between ⅕ pound per square inch and 10 pounds are more preferred and pressures between 1 pound and 6 pounds per square inch are most preferred. By matching the pressure on the transparent window 16 with pressure calculated for CMP polishing conditions (load divided by wafer area) one is enabled to recreate easily pressure conditions on the pad during use. By this means and knowing the area of the entire CMP pad in contact with the wafer, with wafer sizes currently ranging from diameters of 1 to 12 inches, the same pressure for a pad under a known load and therefore actual use conditions can be recreated in the sample holder.

Thermocouple 58 and heater 46 allow the operator to monitor and adjust the temperature of sample 18 during observation both to achieve a desired temperature as closely as possible corresponding for example to conditions of CMP operations with a minimum of apparatus and procedure and also to vary the temperature to observe the effects of this variation on surface contact area of the sample 18 to the transparent window 16.

The present invention may also be applied when load is applied according to the embodiment (not shown) of U.S. patent application Ser. No. 12/108,720 wherein the load is applied to the sample through the force transfer unit by means of a threaded shaft housed in a sliding tube, one end of which tube is affixed to the bottom of the cup, said threaded shaft passing through a fixed end bearing affixed to the other end of the said sliding tube, a threaded slider fit within the tube with a single or concentric spring between the load cell and the shaft and a free end bearing sitting under the load cell and transferring load thereto. Since this allows the load to be adjusted from the top, it is actually more convenient for many applications than the preceding embodiment where the orientation of the laser confocal microscope allows.

Additionally, this embodiment possesses the advantage of enabling an operator to change load and therefore surface pressure uniformly over the entire sample through the ball bearing by means of the single adjustment of the threaded shaft which considerably simplifies that procedure.

The device is used by placing a sample of a CMP polishing pad in the confocal stage according to U.S. patent Ser. No. 12/108,720 setting the load to some light weight and then measuring surface area and measuring the relative surface area of the pad and the distance of the capacitance probe from the window maintaining means. Then the load is increased by a determined amount and both measurements are taken again. This process may be repeated several times to insure that sufficient data has been obtained to characterize the CMP polishing pad to the extent desired. Since CMP polishing pads presently in use show most significant compression and displacement between 0 and about 6 pounds per square inch, an initial load of one pound or so may be attempted. If in respect to one pad an initial pressure of 1 pound per square inch corresponds to a 35% surface area contact between the CMP polishing pad surface and the transparent window, a second pressure of 3 pounds per square inch corresponds to a 50% surface area contact between the CMP polishing pad surface and the transparent window and a final pressure of 5 pounds per square inch corresponds to a 90% surface contact between the CMP polishing pad surface and the transparent window, whereas for a second pad with a different use history, the numbers correspond to 1 psi: 60% contact, 3 psi: 80% contact and 5 psi: 90% contact then it may be suggested that the second pad had surface features that either collapsed quickly for whatever reason under greater pressure or that it was smoother to begin with than the first pad sample. It should also be possible to compare patterns of surface contact with different pressure and pad compression curves to provide additional characterization and possibly structurally analytical information concerning the surface of the CMP polishing pad. Of course part of the compression observed depends upon the characteristics of the material from which the pad was made and its thickness, however, to the extent that CMP polishing pads are relatively uniform in construction, this should be a less important factor than the topography of the CMP polishing pad which in turn depends largely upon the history of use of the CMP polishing pad.

DETAILED DESCRIPTION OF THE DRAWINGS

FIG. 1 is a cross sectional side view of the sample holder.

5 is the confocal microscope.
7 are the flat surfaces of ring 22
9 is the roof or roof ledge of the cap.
10 is the cap.
11 Anterior portion of the cap.
12 is the opening in the anterior portion of the cap.
13 are the walls of the cap.
14 is the window mounting ring 14.
15 is the offset between the window mounting ring 14 and sample.
16 is the transparent window.
17 are the unthreaded holes in ring 22.
18 is the sample.
19 is the posterior end of the cylindrical walls of the cup.
20 is the lip of the cap.
21 is the anterior flat surface of the lip.
22 is the ring with unthreaded holes resting on the anterior flat surface of the lip of the cap.
23 is the posterior flat surface of the lip.
24 are the threaded bolts for applying load.
25 is the outer rim of ring 22.
26 are the springs for bolts 24.
27 are the drilled holes in the cylindrical walls of the cup.
28 is the cup.
29 are the cylindrical walls of the cup 28.
30 is the detachable bottom of the cup
31 is the posterior face of the detachable bottom of the cup.
32 are the pins holding the detachable bottom of the cup in place.
33 is the anterior face of the detachable bottom of the cup.
34 is a load cell.
35 are drilled holes in the sides of the detachable bottom of the cup.
36 is an opening to allow cables to enter the cup.
37 is the thinner portion of the cylindrical walls of the cup 29.
38 is the nylon cylinder portion of the force transfer unit.
39 is the pad.
40 is the hole allowing the thermocouple cable to enter the force transfer unit.
41 is the thermocouple cable.
42 are the spacer rings to hold the force transfer unit guide tube in place.
43 is the hollow cylinder in the nylon cylinder portion 38 of the force transfer unit.
44 is a force transfer unit guide tube supported by the spacer rings 42 that hold the force transfer unit in place
45 is the cylindrical protrusion from the anterior surface of the nylon cylinder portion 38 of the force transfer unit.
46 is a heater.
48 is a cable for the heater.
50 is a cable for the load cell.
51 is an opening in the anterior wall of the hollow cylinder 43 of the nylon cylinder portion 38 of the force transfer unit.
52 is the anterior portion of the force transfer unit -continued DETAILED DESCRIPTION OF THE DRAWINGS
FIG. 1 is a cross sectional side view of the sample holder.

| | |
|---|---|
| 53 | is the posterior end of the force transfer unit |
| 54 | is an opening at the anterior end of the force transfer unit. |
| 55 | is the hollow space inside the anterior portion of the force transfer unit. |
| 56 | is a plug at the anterior end of the force transfer unit. |
| 57 | is the anterior wall of the posterior end 53 of the force transfer unit. |
| 58 | is a thermocouple at the anterior end of the force transfer unit. |
| 60 | is a ball bearing at the anterior end of the force transfer unit. |
| 62 | is a sheet of hard material resting under the sample 18. |
| 64 | is the step in the thickness of the cylindrical walls 29 of the cup 28. |
| 66 | is a ring with threaded holes 69 that rests on the step in the wall of the cup 64. |
| 67 | are the flat surfaces of ring 66. |
| 68 | Is the outer edge of ring 66. |
| 69 | Threaded holes in ring 66. |
| 70 | Inner edge of Ring 66. |
| 72 | Openings in the spacing rings for the capacitance probe 74 |
| 74 | Capacitance probe |
| 76 | Capacitance probe data signal cable |

EFFECTS OF THE INVENTION

This invention in all embodiments allows the surface contact area of a CMP polishing pad to be measured for contact area on a transparent window at known loads which can be altered easily, measurably and without removing the sample while simultaneously providing data as to the displacement or compression of the pad corresponding to the said contact area data. Temperature of the sample can also be measured and adjusted during microscopy and displacement measurement. This provides the operator with far more precise reliable data about the surface conditions and material characteristics of the CMP pad with much greater convenience. Simple confocal sample holders for CMP pads can be used to obtain the relationship between load or pressure on the one hand and the extent to which the surface will contact the surface being polished under a certain load. It does not directly provide information as to the topology of the CMP pad either under load or otherwise. The present invention allows the operator, pad manufacturer or researcher to obtain a far more detailed and useful picture of how pads are altered by their manufacture, by different CMP processes and periods of use. The topological information made available by use and practice of the present invention would be difficult to obtain otherwise under the present state of the art.

What is claimed is:

1. A sample holder for confocal microscopy of chemical mechanical polishing (CMP) pad sample cut or otherwise removed from either a new or used CMP pad that maintains a uniform load and pressure over the part of the sample visible to the a confocal microscope by placing the sample behind a transparent window and holding it against the said window, the sample holder comprising: means for retaining an upper part of the transparent window, which has an offset adjacent the transparent window having the same or essentially the same refractive index as the sample so that when the sample is held against the transparent window, the edges of the sample are outside an outer edge of the transparent window; means for retaining the lower part of the sample which presses the sample under a known load against the transparent window, which means possesses lateral dimensions the same as or less than the corresponding dimensions of the sample; means for transmitting force via a spherical member pressed against the means for retaining the lower part of the sample, the force being transmitted through a load cell to measure the load transferred to the sample via the means for retaining the lower part of the sample via the means for transmitting force via the spherical member, via a means for transferring force and then via the load cell from a posterior housing of the sample holder which is forced together with the means for retaining the upper part of the window by a means for generating a force; and a means for adjusting the known load, wherein the displacement of the surface of the sample at different surface pressures is determined by one or more capacitance probes fixed to the means for transmitting force.

2. The sample holder for confocal microscopy of a sample of chemical mechanical polishing (CMP) pad sample according to claim 1, wherein the means for retaining the upper part of the transparent window is a window mounting ring affixed to the inside bottom surface of a cup placed over a posterior wall closed cylindrical housing and secured to a ring mounted on a stepped ledge in or alternatively part of the said cylindrical housing, which transparent window ring may be opaque or transparent, and the open portion of which comprises a regular curved or polygonal geometric shape perpendicular to the direction of transmission, completely encompassed by the dimensions of the sample and the means for retaining the lower part of the sample comprising a sheet of hard material resting under the sample, pressing the sample opposite the window, the said sheet of hard material corresponding approximately to the dimensions and geometric shape of the transparent portion of the window, and in which the means for transmitting force is a force transfer unit supported within the cup by spacing rings.

3. The sample holder for confocal microscopy of a sample of a chemical mechanical polishing (CMP) pad sample at a known load according to claim 2, wherein the transparent window material comprises sapphire.

4. The sample holder for confocal microscopy of a sample of a chemical mechanical polishing pad sample at a known load according to claim 2, wherein the shape of the uncovered portion of the window is a circle.

5. The sample holder for confocal microscopy of a sample of a chemical mechanical polishing (CMP) pad sample at a known load according to claim 2, wherein the geometric shape of the said sheet of hard material corresponds to and is the close to the same size as the geometric shape of the transparent window.

6. The sample holder for confocal microscopy of a sample of a chemical mechanical polishing (CMP) pad sample at a known load according to claim 2, wherein the covering of the outer part of the transparent window is accomplished by a window mounting ring that comprises an opaque layer or plate surrounding the same and affixed to or resting on the inside surface of the said cap covering the cup and apparatus.

7. The sample holder for confocal microscopy of a sample of a chemical mechanical polishing (CMP) pad sample at a known load according to claim 2, wherein heat is applied to the sample.

8. The sample holder for confocal microscopy of a sample of a chemical mechanical polishing (CMP) pad sample at a known load according to claim 7, wherein the said heat is applied to the sample by means of a heater external to a spindle of thermally conductive material surrounding the force transfer unit and supported by spacing rings.

9. The sample holder for confocal microscopy of a sample of a chemical mechanical polishing (CMP) pad sample at a known load according to claim 8, wherein the heat is applied to the sample by a heater surrounding the thermally conductive portion of the spindle.

10. The sample holder for confocal microscopy of a sample of a chemical mechanical polishing (CMP) pad sample at a known load and a known temperature according to claim 8, where the sample temperature is determined by a thermocouple.

11. The sample holder for confocal microscopy of a sample of a chemical mechanical polishing (CMP) pad sample at a known load according to claim 2, wherein the load applied results in pressures on the transparent window of a range of from 0 pounds per square inch to 11 pounds per square inch.

12. The sample holder for confocal microscopy of a sample of a chemical mechanical polishing (CMP) pad sample at a known load according to claim 1, wherein the means for generating a force comprises a cup secured by spring compressed bolts through holes in a ring supported by an outward turning lip of the cup to threaded holes in a ring resting on a step in the cylindrical walls.

13. The sample holder for confocal microscopy of a sample of chemical mechanical polishing (CMP) pad sample at a known load according to claim 1, wherein the number of capacitance probes used is one.

14. The sample holder for confocal microscopy of a sample of chemical mechanical polishing (CMP) pad sample at a known load according to claim 1, wherein the capacitance probe is attached to an analysis and readout device.

15. The sample holder for confocal microscopy of a sample of chemical mechanical polishing (CMP) pad sample at a known load according to claim 1, wherein the capacitance probe is pre-calibrated to determine distance.

16. The sample holder for confocal microscopy of a sample of chemical mechanical polishing (CMP) pad sample at a known load according to claim 1, wherein the capacitance probe is fixed by an adhesive.

17. The sample holder for confocal microscopy of a sample of a chemical mechanical polishing (CMP) pad at a known load according to claim 1, wherein the load is applied to the sample through the force transfer unit by means of a threaded shaft housed in a sliding tube, one end of which tube is affixed to the bottom of the cup, said threaded shaft passing through a fixed end bearing affixed to the other end of the said sliding tube, a threaded slider fit within the tube with a single or concentric spring between the load cell and the shaft and a free end bearing sitting under the load cell and transferring load thereto.

18. The sample holder for confocal microscopy of a sample of chemical mechanical polishing (CMP) pad sample at a known load according to claim 1, wherein the capacitance probe is fixed to the spacing rings of the spindle guiding the means for transferring force.

19. A method for observing a sample of a chemical mechanical polishing (CMP) pad comprising holding a CMP pad sample cut or otherwise removed from either a new or used CMP pad using a sample holder for confocal microscopy that maintains a uniform load and pressure over the part of the sample visible to a confocal microscope by placing the sample behind a transparent window and holding it against the said window, the sample holder comprising: a means for retaining an upper part of the transparent window, which has an offset adjacent the transparent window having the same or essentially the same refractive index as the sample so that when the sample is held against the transparent window, the edges of the sample are outside the outer edge of the transparent window; means for retaining the lower part of the sample which presses the sample under a known load against the transparent window, which means possesses lateral dimensions the same as or less than the corresponding dimensions of the sample; means for transmitting force via a spherical member pressed against the means for retaining the lower part of the sample, the force being transmitted through a load cell to measure the load transferred to the sample via the means for retaining the lower part of the sample via the spherical member, via a means for transferring force and then via the load cell from the posterior housing of the sample holder which is forced together with the means for retaining the upper part of the transparent said window by a means for generating a force; and a means for adjusting the known load, wherein the displacement of the surface of the sample at different surface pressures is determined by one or more capacitance probes fixed to the means for transferring force, and view the sample of the new or used CMP pad by confocal microscope.

20. The method for observing a sample of a chemical mechanical polishing (CMP) pad sample at a known load by confocal microscopy according to claim 19, wherein the transparent window material comprises sapphire.

21. The method for observing a sample of a chemical mechanical polishing (CMP) pad sample at a known load by confocal microscopy according to claim 19, wherein the said shape of the uncovered portion of the window is a circle.

22. The method for observing a sample of a chemical mechanical polishing (CMP) pad sample at a known load by confocal microscopy according to claim 19, wherein the geometric shape of the sheet of hard material corresponds precisely to and is the same size as the geometric shape of the uncovered portion of the transparent window.

23. The method for observing a sample of a chemical mechanical polishing (CMP) pad sample at a known load by confocal microscopy according to claim 19, wherein the covering of the window is accomplished by the window mounting ring and which comprises an opaque layer or plate surrounding the same affixed to or resting on the inside of the said cap covering the cup.

24. The method for observing a sample of a chemical mechanical polishing (CMP) pad sample at a known load by confocal microscopy according to claim 19, wherein heat is applied to the sample.

25. The method for observing a sample of a chemical mechanical polishing (CMP) pad sample at a known load by confocal microscopy according to claim 24, wherein the said heat is applied to the sample by means of a heater external to a spindle of thermally conductive material surrounding the means for transferring force and supported by spacing rings.

26. The method for observing a sample of a chemical mechanical polishing (CMP) pad sample at a known load by confocal microscopy according to claim 24, wherein the heat is applied to the sample by a heater surrounding the copper portion of the spindle.

27. The method for observing a sample of a chemical mechanical polishing (CMP) pad sample at a known load by confocal microscopy according to claim 19, wherein the load applied results in pressure on the surface of the transparent window of between 0 pounds per square inch and 11 pounds per square inch.

28. The method for observing a sample of a chemical mechanical polishing (CMP) pad sample at a known load by confocal microscopy according to claim 19, wherein the means for generating force comprises a cup secured by spring compressed bolts through holes in a ring supported by an outward turning lip of the cup to threaded holes in a ring resting on a step in the cylindrical walls.

29. The method for observing a sample of a chemical mechanical polishing (CMP) pad sample at a known load by confocal microscopy according to claim 24, wherein the sample temperature is determined by a thermocouple.

30. The method for observing a sample of a chemical mechanical polishing (CMP) pad sample at a known load by confocal microscopy according to claim 19, wherein the number of capacitance probes used is one.

31. The method for observing a sample of a chemical mechanical polishing (CMP) pad sample at a known load by confocal microscopy according to claim 19, wherein the capacitance probe is attached to an analysis and readout device.

32. The method for observing a sample of a chemical mechanical polishing (CMP) pad sample at a known load by confocal microscopy according to claim 19, wherein the capacitance probe is pre-calibrated to determine distance.

33. The sample holder for confocal microscopy of a sample of chemical mechanical polishing (CMP) pad at a known load according to claim 18, wherein the capacitance probe is fixed by an adhesive.

34. The method for observing a sample of a chemical mechanical polishing (CMP) pad at a known load by confocal microscopy according to claim 19, wherein the capacitance probe is fixed to the spacing rings of the spindle guiding the force transfer unit.

35. The method for observing a sample of a chemical mechanical polishing (CMP) pad at a known load by confocal microscopy according to claim 19, wherein the known load is applied by a threaded shaft housed in a sliding tube, one end of which tube is affixed to the bottom of the cup, said threaded shaft passing through a fixed end bearing affixed to the other end of the said sliding tube, a threaded slider fit within the tube with a single or concentric spring between the load cell and the shaft and a free end bearing sitting under the load cell and transferring load thereto.

36. The method for observing a sample of a chemical mechanical polishing (CMP) pad at a known load by confocal microscopy according to claim 35, wherein the means of turning the threaded shaft is mechanical.

\* \* \* \* \*